United States Patent
Wong et al.

(10) Patent No.: US 11,241,868 B2
(45) Date of Patent: Feb. 8, 2022

(54) CLEAR FILM FOR TAPES AND LABELS

(71) Applicant: Inteplast Group Corporation, Livingston, NJ (US)

(72) Inventors: Jame Wong, Port Lavaca, TX (US); Chris Watts, Victoria, TX (US); Jenchyou Hwang, Sugar Land, TX (US); Juan Rosales, Edna, TX (US); Todd O'Reilly, Morristown, TN (US); Ron Silen, Livingston, NJ (US); Lisa Vasquez, Morristown, TN (US)

(73) Assignee: Inteplast Group Corporation, Livingston, NJ (US)

(*) Notice: Subject to any disclaimer, the term of this patent is extended or adjusted under 35 U.S.C. 154(b) by 224 days.

(21) Appl. No.: 16/287,384

(22) Filed: Feb. 27, 2019

(65) Prior Publication Data

US 2019/0263098 A1    Aug. 29, 2019

Related U.S. Application Data

(60) Provisional application No. 62/635,909, filed on Feb. 27, 2018.

(51) Int. Cl.
*B32B 27/20* (2006.01)
*B32B 27/08* (2006.01)
*B32B 27/32* (2006.01)

(52) U.S. Cl.
CPC .............. *B32B 27/20* (2013.01); *B32B 27/08* (2013.01); *B32B 27/32* (2013.01); *B32B 2250/03* (2013.01); *B32B 2250/40* (2013.01); *B32B 2264/101* (2013.01); *B32B 2307/746* (2013.01); *B32B 2405/00* (2013.01); *B32B 2519/00* (2013.01)

(58) Field of Classification Search
CPC .......... B32B 27/20; B32B 27/08; B32B 27/32
See application file for complete search history.

(56) References Cited

U.S. PATENT DOCUMENTS

| | | | | |
|---|---|---|---|---|
| 4,419,411 A * | 12/1983 | Park | ................... | B32B 27/32 |
| | | | | 428/516 |
| 5,366,645 A * | 11/1994 | Sobottka | ............... | C08K 9/06 |
| | | | | 508/136 |
| 2002/0173602 A1* | 11/2002 | Appleyard | ............. | D01F 6/30 |
| | | | | 526/124.3 |
| 2003/0194575 A1* | 10/2003 | Tau | ...................... | C08L 23/142 |
| | | | | 428/515 |
| 2005/0203264 A1* | 9/2005 | Musgrave | ............ | C08F 210/16 |
| | | | | 526/348 |
| 2007/0149660 A1* | 6/2007 | Kumar | ................. | C08K 5/527 |
| | | | | 524/115 |
| 2008/0206505 A1* | 8/2008 | Blackwell | ............. | G09F 3/10 |
| | | | | 428/41.8 |
| 2016/0145412 A1* | 5/2016 | Lake, Jr. | ............... | B32B 27/18 |
| | | | | 524/396 |

OTHER PUBLICATIONS

Thomas—Synthetic Silica—Book=Surface Coatings—1993 (Year: 1993).*

* cited by examiner

*Primary Examiner* — Callie E Shosho
*Assistant Examiner* — John Vincent Lawler
(74) *Attorney, Agent, or Firm* — Stinson LLP

(57) ABSTRACT

A multilayer film for use in adhesive tape or adhesive label applications comprising a core layer and skin layers on each side of the core layer. The core layer comprises a polypropylene mini-random homopolymer, wherein the mini-random homopolymer comprises polypropylene, up to 2 wt % ethylene components, and a acid neutralizer in a concentration up to 5000 ppm calcium. The skin layers each comprise a) at least about 95 wt % of a polypropylene mini-random homopolymer comprising polypropylene, up to 2 wt % ethylene components, and an acid neutralizer in a concentration up to about 5000 ppm, and b) an anti-block agent in a concentration up to about 1 wt %, wherein the anti-block agent comprises at least 95 wt % homopolymer of polypropylene and 1 to 5 wt % of silica having a particle size between about 1 to 3 μm.

19 Claims, No Drawings

CLEAR FILM FOR TAPES AND LABELS

REFERENCE TO RELATED APPLICATIONS

This application claims priority to U.S. provisional application 62/635,909 filed Feb. 27, 2018, the entire disclosure of which is incorporated herein by reference.

FIELD OF THE INVENTION

The present invention generally relates to clear plastic adhesive tape and clear plastic adhesive labels.

BACKGROUND OF THE INVENTION

Clear plastic adhesive tapes commercially available today typically consist of a multilayer (biaxially oriented polypropylene) BOPP-type film and an acrylic type adhesive. Clear adhesive labels commercially available today typically consist of a multilayer BOPP-type film and an acrylic or solvent acrylic type adhesive.

SUMMARY OF THE INVENTION

Briefly, therefore, the invention is directed to a multilayer film for use in adhesive tape or adhesive label applications comprising a core layer comprising a polypropylene mini-random homopolymer, wherein the mini-random homopolymer comprises polypropylene, up to 2 wt % ethylene components, and an acid neutralizer in a concentration up to 5000 ppm calcium; and a first skin layer on a first side of the core layer and a second skin layer on a second side of the core layer, wherein the skin layers each comprise a) at least about 95 wt % of a polypropylene mini-random homopolymer comprising polypropylene, up to 2 wt % ethylene components, and calcium stearate in a concentration up to about 5000 ppm calcium stearate, and b) an anti-block agent in a concentration up to about 1 wt %, wherein the anti-block agent comprises at least 95 wt % homopolymer of polypropylene and 1 to 5 wt % of silica having a particle size between about 1 to 3 µm.

Other objects and features will be in part apparent and in part pointed out hereinafter.

DETAILED DESCRIPTION OF PREFERRED EMBODIMENTS

In a first application for the film of the invention, the film is used in the manufacture of adhesive tape. This film is a biaxially oriented polypropylene (BOPP) film. In the preferred embodiment, the film has three layers.

The skin layer in the film of the invention contains 95 wt % or more of a C2 mini-random homopolymer polypropylene. This mini-random homopolymer contains 0.5 to 1 wt % C2 with up to 5000 ppm of an acid neutralizer, preferably calcium stearate, such as 300 to 4600 ppm (preferably at least about 325 ppm or 350 ppm, such as between about 375 and about 750 ppm) acid neutralizer preferably an organic-based acid neutralizer, more preferably calcium stearate, and 95 to 99 wt % isotactic polypropylene. The C2 component is ethylene. The function of the calcium stearate is to neutralize the acidity of the polymer. In addition to this mini-random homopolymer, the skin layer of the film contains 0.2 to 1 wt % of an anti-block agent comprising at least 95 wt % homopolymer of polypropylene and 1 to 5 wt % of 1 to 3 micron particle size synthetic silica.

The core layer contains more than 97 wt % of a C2 mini-random polypropylene homopolymer such as the mini-random homopolymer in the skin layer. In a preferred embodiment, this homopolymer constitutes 100% of the core layer.

The core layer has a thickness between about 25 and about 200 µm, such as between about 25 and 75 µm. There is a skin layer on each side of the core layer, wherein the skin layer is between about 0.25 and about 1.5 µm thick, such as between about 0.5 and 1.5 or 1 µm thick.

The film of the invention is preferably prepared by a conventional continuous extrusion process.

The film has an overall thickness of between about 25 µm and about 200 µm, such as between about 25 µm and about 100 µm. In some embodiments, the overall thickness is between about 40 and about 80 µm, such as between about 50 µm and about 60 µm.

The film has a haze value of less than about 2%, preferably less than about 1.5%, more preferably less than about 0.7%. In one preferred embodiment, the haze value is about 0.5%. Haze value in this context is determined by ASTM D1003.

The film has a gloss value of more than about 60, preferably between about 70 and about 150, such as between about 80 and about 100. In one preferred embodiment, the gloss value is about 90 units. Gloss is determined by ASTM D2457, 45° angle.

While BOPP films of this nature typically have an inherent yellowness imparted by the resin and additives that detracts from clarity, these problems in the film of the invention are minimized by several aspects of the current invention. In one aspect, the films of the invention use a lower silica content in the skin layers in comparison to prior art films. In another aspect, the silica used has a lower particle size. Also, the films are relatively thinner, and are stretched in the transverse direction (TDO) at a low temperature, which is believed to improve clarity. Also, the presence of ppm levels of the organic-based acid neutralizer calcium stearate in the skin layers is believed to reduce yellowness. The use of C2 mini-random homopolypropylene polymer as the principal component of the skin layers is also believed to enhance clarity.

The adhesive used in connection with the film of the invention to form adhesive tape of the invention is preferably a hot melt adhesive. Generally speaking, hot melt adhesives are less clear and more difficult to work with than acrylic adhesives. But this invention is able to use a hot melt adhesive whereas prior tapes use acrylic adhesives because the film of the invention has improved clarity.

In a second embodiment of the invention, the film is incorporated into a label. The main difference between the tape and label applications is labels are normally laminations of two or more substrates. Labels are generally printed by various print methods, such as flexo, rotogravure, lithography, etc.

Inasmuch as labels are printable and tape typically need not be printable, the label formulations of the invention in some embodiments include ingredients which enhance printability. For example, the antiblock incorporated in the skin for label applications is of a size and distribution so as to minimize impact on ink lay down that could cause defects such as pinholes.

The film of the invention is typically subjected to a surface treatment, such as a flame treatment or corona treatment. The purpose of this treatment is to oxidize the skin surface to prepare it for reception of adhesive. When the film is used in tape applications, it is typically treated only on the one side, for receiving adhesive. When the film is used in label applications, it is typically treated on both sides, for receiving adhesive on one side and printing on the other side.

The adhesive used in connection with the film of the invention to form labels of the invention is preferably a clear emulsion acrylic adhesive or a solvent acrylic adhesive.

EXAMPLE

A film of the invention (designated XT55) was prepared and tested for haze in comparison to prior art commercially available tape and label films. The film of the invention comprised a 53.4 µm thick core layer sandwiched between two 0.8 µm thick skin layers.

The core layer contained 100% of 0.6 wt % C2 in mini-random homo polypropylene. The C2 component was ethylene.

The skin layers each comprised 99.75 wt % of a mini-random polypropylene homopolymer. This homopolymer contains 0.6 wt % C2 (ethylene) and 400 ppm calcium stearate in the homo polypropylene. The skin layer also contains 0.25 wt % of homo polypropylene comprising 98 wt % polypropylene with 2 wt % of 2 µm particle size synthetic silica.

A comparative film was prepared corresponding to commercially available tape films. This comparative film had a 57.6 µm thick core layer of 100% of homo PP sandwiched between two 1.2 µm thick skin layers. Each skin layer was 98.0 wt % homo PP plus 2.0 wt % of the anti-block component comprising 5 wt % of 5 micron synthetic silica in homo PP.

It can be seen that the skin layers in the film of the invention, in comparison to the commercial tape film, are thinner, have a lower synthetic silica concentration, and have a smaller synthetic silica particle size.

A comparative film was also prepared corresponding to a commercially available label film. This film had a 50 µm thick core layer of 100% homopolypropylene polymer, sandwiched between two 2.5µ, thick tie layers of 100% homopolypropylene polymer. The film also included a top skin layer of A) 47.0 wt % of a COPP (copolymer polypropylene) comprising 5 wt % C2 (ethylene) in random COPP, B) 47.0 wt % of a COPP comprising 2 wt % C2 (ethylene) in random COPP, and C) 6 wt % of a COPP comprising 5 wt % 5 µm silicon in 95 wt % COPP.

Haze tests were conducted on single sheets of these multilayer films, and on 16-layer laminates comprising 16 sheets, each sheet comprising the multilayer films described in this example. The test results were as follows:

TABLE 1

Haze, Yellow Index, and b* value comparison

| Film Type | Single Sheet | | 16 Sheet | |
|---|---|---|---|---|
| | Haze | Inner Haze | Yellow Index | b* |
| Invention | 0.50 | 1.22 | 6.45 | 3.77 |
| Comparative Label | 3.30 | 12.10 | 5.76 | 3.38 |
| Comparative Tape | 1.80 | 22.03 | 6.56 | 3.73 |

The results show that the inner haze value 1.22 for the laminates made from films of the invention is substantially lower than the haze value for the laminates made from the comparative films. The haze tests were conducted under the procedures of ASTM D1003. The "b*" component is the "yellow" coordinate location in the "L*a*b* color space" often referenced in the industry.

The 16-sheet samples were prepared by first preparing 16 individual sheets (5 cm by 9 cm) of the multilayer films described in this example. Each sheet was cleaned using alcohol, and dried. A first sheet and second sheet were layered, and then EP grade paraffin liquid was spread evenly on the top surface of the second sheet. Then a third sheet was lain over the second sheet, and paraffin liquid was spread evenly on the top surface of the third sheet. This was repeated for all layers, except that paraffin was not spread on top of the 16th sheet.

Yellow Index is a number based on spectrophotometric data and describes a change in color of a film from clear to yellow. This predicts color changes caused by exposure to natural light, for example. This test was conducted under ASTM E313.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A multilayer film for use in adhesive tape or adhesive label applications comprising:
   a core layer comprising a polypropylene mini-random homopolymer, wherein the mini-random homopolymer comprises polypropylene, up to 2 wt % ethylene components, and an acid neutralizer in a concentration up to 5000 ppm calcium;
   a first skin layer on a first side of the core layer and a second skin layer on a second side of the core layer, wherein the skin layers each comprise
   a) at least about 95 wt % of a polypropylene mini-random homopolymer comprising polypropylene, up to 2 wt % ethylene components, an acid neutralizer in a concentration up to about 5000 ppm, and
   b) an anti-block agent in a concentration of 0.2 to 1 wt. %, wherein the anti-block agent comprises at least 95 wt % homopolymer of polypropylene and 1 to 5 wt % of silica having a particle size between about 1 to 3 µm;
   wherein the first and second skin layers each have an amount of the homopolymer of polypropylene by weight and an amount of the silica by weight and wherein a ratio of the amount of the homopolymer of polypropylene by weight to the amount of silica by weight is greater than 95-to-5.

2. The multilayer film of claim 1 consisting of the core layer and the first and second skin layers.

3. The multilayer film of claim 1 wherein the core layer has a thickness between about 20 and about 200 µm.

4. The multilayer film of claim 1 wherein the core layer has a thickness between about 25 and about 75 µm.

5. The multilayer film of claim 1 wherein each skin layer has a thickness between about 0.25 and about 1.5 µm.

6. The multilayer film of claim 1 wherein:
the multilayer film consists of the core layer and the first and second skin layers;
the core layer has a thickness between about 20 and about 200 μm; and
each skin layer has a thickness between about 0.25 and about 1.5 μm.

7. The multilayer film of claim 1 wherein:
the multilayer film consists of the core layer and the first and second skin layers;
the core layer has a thickness between about 25 and about 75 μm; and
each skin layer has a thickness between about 0.25 and about 1.5 μm.

8. The multilayer film of claim 1 wherein the core layer comprises at least about 97 wt % of said polypropylene mini-random homopolymer.

9. The multilayer film of claim 1 wherein the core layer consists of only said polypropylene mini-random homopolymer.

10. The multilayer film of claim 1 wherein each skin layer comprises 95 to 99.8 wt % of the polypropylene mini-random homopolymer and 0.2 to 1 wt % of the anti-block agent.

11. The multilayer film of claim 1 wherein each skin layer consists of 0.2 to 1 wt % of the anti-block agent and a balance of the polypropylene mini-random homopolymer.

12. The multilayer film of claim 1 wherein the acid neutralizer is calcium stearate.

13. The multilayer film of claim 1 wherein polypropylene mini-random homopolymer of the skin layer comprises between 300 and 4600 ppm of calcium stearate as the acid neutralizer.

14. The multilayer film of claim 1 wherein the polypropylene mini-random homopolymer in at least one of the core layer and the skin layer comprises between 325 and 750 ppm of calcium stearate as the acid neutralizer.

15. The multilayer film of claim 1 wherein:
the multilayer film consists of the core layer and the first and second skin layers;
the core layer has a thickness between about 20 and about 200 μm;
each skin layer has a thickness between about 0.25 and about 1.5 μm;
the core layer comprises at least about 97 wt % of said polypropylene mini-random homopolymer;
each skin layer comprises 95 to 99.8 wt % of the polypropylene mini-random homopolymer and 0.2 to 1 wt % of the anti-block agent;
the skin layer polypropylene mini-random polymer comprises between 325 and 750 ppm calcium stearate as the acid neutralizer; and
the anti-block agent comprises at least 95 wt % homopolymer of polypropylene and 1 to 5 wt % of 1 to 3 micron particle size silica.

16. The multilayer film of claim 1 wherein the multilayer film has a haze value of less than 2%.

17. An adhesive tape or an adhesive label comprising the multilayer film of claim 1 and an adhesive on one of the skin layers.

18. The adhesive tape or the adhesive label of claim 17 wherein the adhesive is a hot melt adhesive.

19. The multilayer film of claim 1 wherein in each skin layer, the wt % of the polypropylene mini-random homopolymer plus the wt % of the anti-block agent equals 100 wt %.

* * * * *